United States Patent [19]

Lefaudeux et al.

[11] 4,031,502

[45] June 21, 1977

[54] HYDROPHONE WITH ACOUSTIC REFLECTOR

[75] Inventors: Francois L. M. Lefaudeux, Le Relecq-Kerhoun; Michel Georges Quivy, Six Fours Les Plages, both of France

[73] Assignee: Etat Francais, Paris, France

[22] Filed: Apr. 7, 1976

[21] Appl. No.: 674,605

[30] Foreign Application Priority Data

Apr. 11, 1975 France ............................ 75.11305

[52] U.S. Cl. ................................ 340/10; 340/8 FT

[51] Int. Cl.[2] ........................................ H04B 13/00

[58] Field of Search ............... 340/8 R, 8 FT, 8 PC, 340/9, 10, 11, 12 R, 13 R, 14

[56] References Cited

UNITED STATES PATENTS

| | | | |
|---|---|---|---|
| 3,054,004 | 9/1962 | Lord | 310/9.1 X |
| 3,329,408 | 7/1967 | Branson | 310/9.1 X |
| 3,336,573 | 8/1967 | Gallaway et al. | 310/8.2 X |
| 3,546,012 | 12/1970 | Dixon et al. | 310/8.2 |
| 3,555,311 | 1/1971 | Weber | 340/10 |
| 3,573,394 | 4/1971 | Birnbaum | 310/9.1 X |
| 3,763,464 | 10/1973 | Laurent | 340/10 X |
| 3,901,352 | 8/1975 | Cluzel | 340/8 FT |
| 3,943,388 | 3/1976 | Massa | 310/9.1 X |

*Primary Examiner*—Harold Tudor

[57] ABSTRACT

A hydrophone comprising an acoustical reflector constituted by a sealed, flexible and deformable container containing two rigid parallel plates separated by lattice sheets of interlaced filaments and at least one piezoelectric transducer with a thin flexible blade fixed at its periphery to a rigid annular support. The reflector and the transducer are entirely embedded in a common synthetic resin layer having a thickness of several millimeters which secures them together and maintains the transducer in proximity to the front face of the acoustical reflector. The layer of resin has a reduced thickness of the order of 1 mm facing the transducer.

6 Claims, 6 Drawing Figures

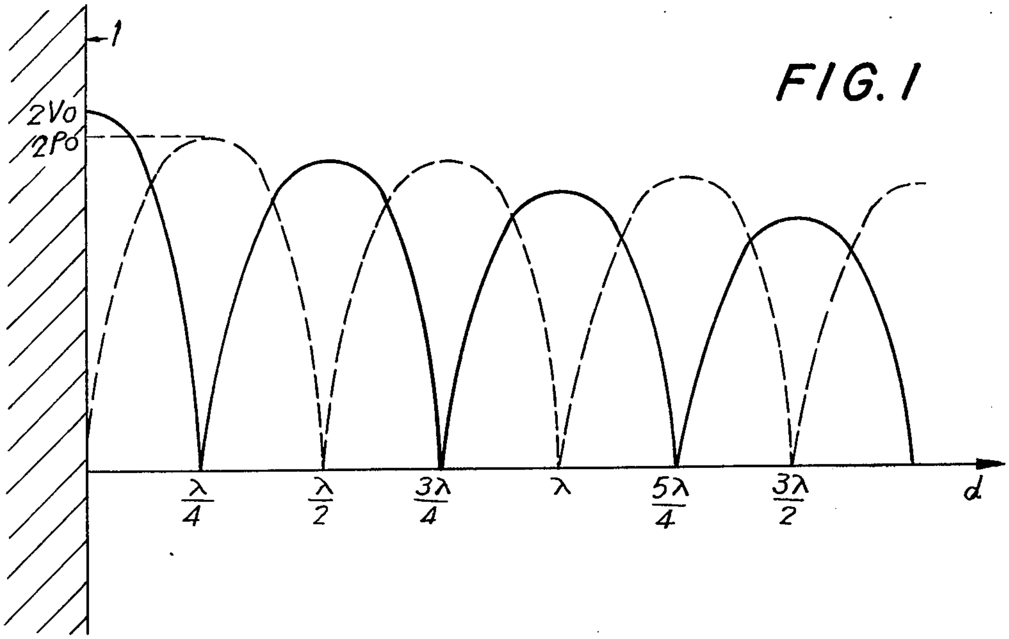
FIG. 1
FIG. 3
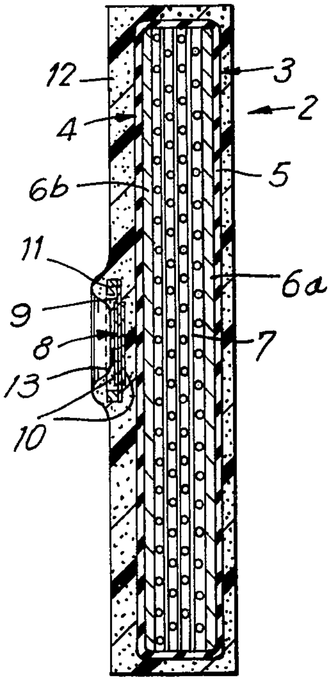
FIG. 5
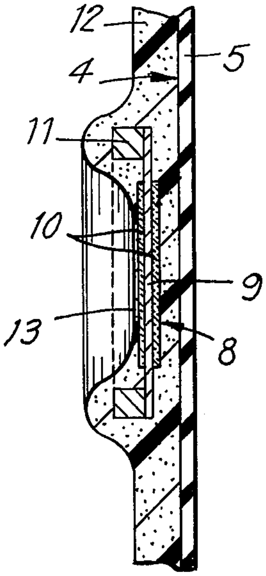

FIG. 2
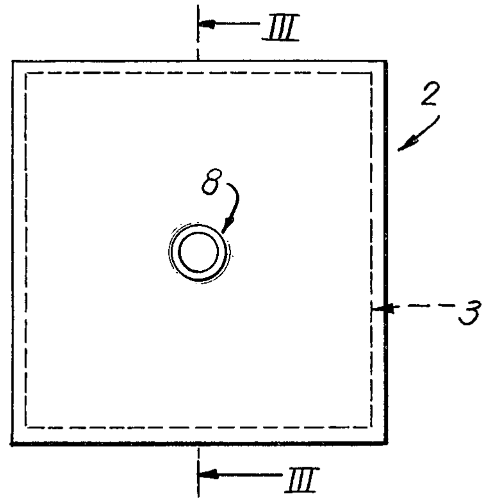
FIG. 4
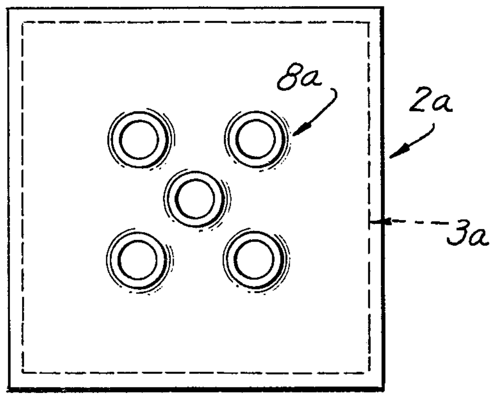
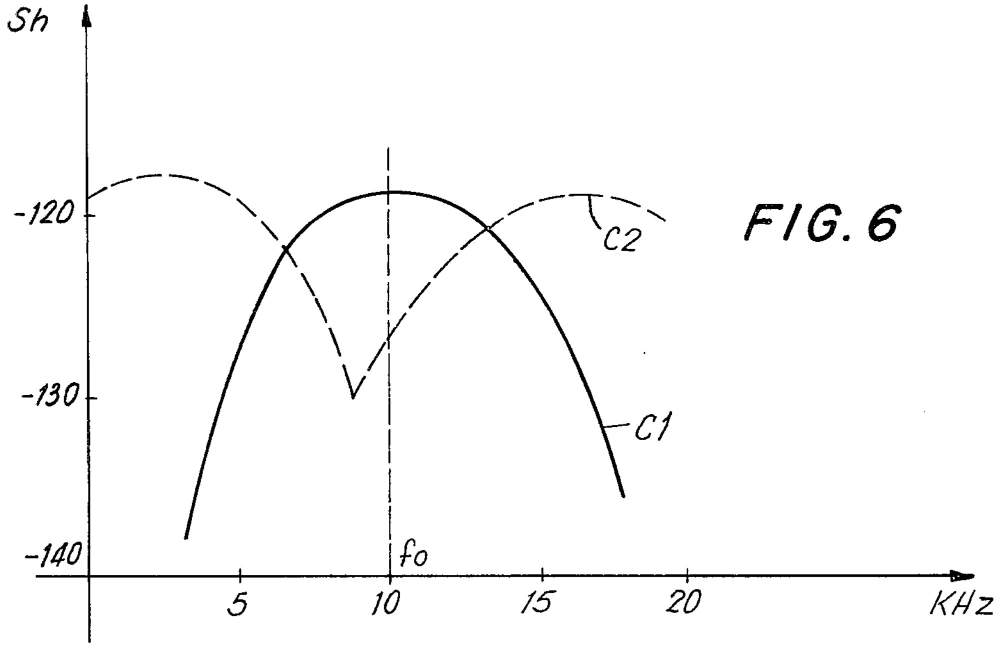
FIG. 6

HYDROPHONE WITH ACOUSTIC REFLECTOR

FIELD OF THE INVENTION

The present invention relates to hydrophones with acoustic reflectors, usable, for example, in the construction of underwater acoustic apparatus, notably sonar antennaes.

BACKGROUND OF THE INVENTION

Sonar antennaes include hydrophones at the rear of which can be placed reflectors in order to improve the reception of acoustic waves.

It is recalled that when a planar beam of acoustic waves is reflected on a plane surface there is obtained, in front of the reflector, a stationary system of waves which gives rise to pressure and velocity fields whoses nodes are spaced at ($\lambda/2$), $\lambda$ being the wave length of the acoustic vibration.

It is known that the velocity is proportional to the pressure gradient and the velocity field is therefore offset by ($\lambda/4$) with respect to the pressure field. The stationary pressure waves have a node or minimum value at the surface of the reflector whereas the stationary velocity waves have a peak value thereat. The hydrophones currently utilized, in combination with a reflector, are hydrophones comprising stacks of piezoelectric elements sensitive to pressure. In order to obtain a maximum sensitivity, one must therefore place these hydrophones in front of the reflector, at a distance ($\lambda/4$) therefrom where the first peak of the pressure field is situated. As this distance varies with wave length, it follows that the sensitivity of the hydrophone has a maximum value for a determined frequency and decreases very rapidly on both sides of this frequency. This loss of sensitivity is not very objectionable for hydrophones with narrow bands such as those which are used for receiver antennaes with active detection which receive the return echo of a target of a wave which they themselves emit. In contrast, it considerably reduces the effectivity of passive sonar receiver antennaes which seek to detect all signals coming from a possible target and therefore which can be situated in a very wide frequency band and notably in the range of low frequencies.

Also known are hydrophones with flexible blades, each composed of one thin flexible blade fixed at its periphery to an annular support and carrying on one or both faces a piezoelectric plate. The lobes of sensitivity of such hydrophones show that these are directive, therefore, more sensitive to variations of velocity than to variations of pressure.

SUMMARY OF THE INVENTION

An object of the present invention is to provide hydrophones whose sensitivity is improved by the presence of a reflector behind them and remains substantially constant over a wide frequency band, notably at low frequencies.

Another object of the present invention is to provide hydrophones equipped with a reflector which resists high hydrostatic pressure and which can therefore be utilized at great depths of immersion.

Another object of the invention is to provide hydrophones forming an assembly with an acoustical reflector.

These and other objects of the invention are obtained by means of a hydrophone with an acoustic reflector comprising, in combination, an acoustical reflector, at least one piezoelectric transducer including one thin flexible blade fixed at its periphery on an annular rigid support, said flexible blade being disposed a slight distance in front of the reflector, as close as possible thereto.

A hydrophone according to the invention, particularly adapted to great depths of immersion, comprises an acoustical reflector constituted of a sealed casing of a flexible and deformable material containing two rigid parallel plates separated by a lattice of interlaced filaments.

A hydrophone with incorporated reflector according to the invention is composed of an acoustical reflector and at least one piezoelectric transducer having a flexible blade encapsulated in a uniform layer of synthetic resin having a thickness of the order of several millimeters, which renders them solid and maintains the transducer in proximity to the front face of the acoustical reflector.

The result of the invention is a novel hydrophone with acoustical reflector.

An advantage of this hydrophone is a high sensitivity which remains constant and maximal in a wide band extending to the low frequencies and which renders this hydrophone particularly adapted to the construction of passive sonar receiver antennaes.

Another advantage of this hydrophone in the embodiment where the acoustical reflector is constituted by a sealed, flexible and deformable casing containing two flat rigid plates separated by lattice layers of crossed filaments, is that it retains a high sensitivity under great hydrostatic pressures which makes this hydrophone well adapted to the construction of passive sound buoys immersed to great depths.

Another advantage is that is simplifies the construction of reflective antennaes due to the fact that the hydrophones incorporate their reflector and that it is sufficient to juxtapose them to constitute an antennae without having to construct special supports to maintain the hydrophones in front of the reflector.

The following description refers to the annexed drawings which illustrate embodiments of the invention without any limitative effect.

BRIEF DESCRIPTION OF THE DRAWING

FIG. 1 diagrammatically shows pressure and velocity waves in a field of acoustical stationary waves in front of an acoustical reflector.

FIG. 2 is a front view of one embodiment of a hydrophone according to the invention.

FIG. 3 is a sectional view of this embodiment taken along line 3—3 in FIG. 2.

FIG. 4 is a front view of another embodiment of a hydrophone according to the invention.

FIG. 5 is a sectional view on much greater scale, of a central portion of the embodiment of FIG. 3.

FIG. 6 is a graph of a comparison of the sensitivities of a known hydrophone and a hydrophone according to the invention.

DETAILED DESCRIPTION

FIG. 1 shows at 1 the front face of an acoustical reflector at which is reflected a plane beam of acoustical waves of wave length $\lambda$. This acoustical beam of waves is composed of pressure waves of intensity Po and velocity waves of intensity Vo. This gives birth at the front of the reflector 1 to stationary waves which travel as pressure and velocity waves.

There is shown on the abscissa distances from the reflector. The stationary velocity waves shown in solid lines have a peak at the surface of the reflector of intensity 2Vo and nodes or valleys situated at distances (λ/4), (3λ/4), (5λ/4), . . . from the reflector.

The stationary pressure waves have nodes or valleys at the surface of the reflector and at distances (λ/2), λ, (3λ/2), . . . therefrom.

Piezoelectric transducers which are conventionally used in the construction of hydrophones are placed in front of a reflector, said transducers being sensitive to variations of pressure and therefore placed at a distance from the reflector substantially equal to (λ/4), whereat the first peak of the pressure intensity 2Po is disposed and where the variations of pressure are therefore greatest. For example, a hydrophone adopted to receive a frequency band of about 10 KHZ will be situated in the vicinity of 15 centimeter from the front face of a planar reflector which requires the provision of supports to maintain the columns of hydrophone on an antennae at a certain distance from the reflector. The distance (λ/4) varies with the wave length, that is to say, with the frequency, but also with the velocity of propagation which depends on temperature and the salinity of the water.

According to the invention, there are utilized piezoelectric transducers with flexible blades which are very directive and which are therefore more sensitive to velocity variations than to pressure variations and these are placed in proximity to the front face of the reflector, that is to say, at the place where the variations of velocity are greatest but without the flexible plate of the blade from coming into contact with the reflector when the blade is pressurized and freely deforms in flexure.

FIG. 2 shows a front face of a hydrophone 2 according to the invention and FIG. 3 is a sectional view taken along line 3—3 in FIG. 2.

This hydrophone comprises an acoustical reflector 3 whose face 4 is the reflective face turned in the direction where it can receive a planar acoustical wave. The reflector 3 has, for example, the form of a square of 170 mm on each side.

The reflector is composed, in conventional fashion, of a sealed container or casing 5 which is flexible and deformable, for example, a casing of rubber or of an elastomeric material which contains two planar rigid plates *6a*, 6 *b* parallel to one another, for example, two metallic plates separated by a stack of lattice sheets 7, for example, lattices of interlaced metallic filaments. Such acoustic reflectors are known and it is also known that they have a high reflective power even under high hydrostatic pressure and at low frequencies.

The sealed casing 5 encloses a certain volume of air for transmitting the acoustical waves and the surface of separation between the water and the air, having acoustical impedences which are very different, constitute a highly reflective surface. The deformable casing 5 transmits the pressures and the air contained in the casing is in equilibrium with the exterior. The stack of lattice sheets of crossed filaments placed between the two rigid plates avoids crushing of the casing when it is subjected to high pressure, and due to the fact that the contacts between the sheets are point-wise the acoustical waves are transmitted weakly through this structure. Such acoustical reflectors have a high efficiency practically independent of the pressure over the entire frequency band currently utilized in acoustical underwater work inclusive of low frequencies.

In front of the reflective face 4 is placed a piezoelectric transducer 8 having a flexible blade of bilamellar or trilamellar type.

Such transducers are known. It is known that they are composed of a thin flexible membrane 9 of round profile fixed at its periphery to an annular rigid support 11, for example, a ring of brass having a diameter of 25 mm and a thickness of 4 mm. On one or more faces of this membrane are adhered piezoelectric discs 10, for example, ceramic discs such as titanozirconate inserted between two electrodes.

The lobes of sensitivity of such transducer according to the bearing of the sonar source with respect to the axis of the transducers, shows that these transducers have a high directivity, a wide acoustical frequency band and that they are therefore more sensitive to variations of velocity than to variations of pressure due to the acoustical waves.

A hydrophone according to the present invention utilizes this property.

The novelty of the invention resides in the combination of a transducer have a flexible blade with an acoustical reflector of any suitable type and preferably an acoustical reflector of the type described hereinabove, in which combination, the mutual relations of positioning and of relations of the surfaces between the transducer and the reflector are specifically determined.

From the point of view of positioning, the flexible blade 9 is disposed at the side of the ring situated adjacent the front face 4 of the reflector and very close to this front face without being in contact therewith, such that it can freely deform in flexure under the effect of the acoustical waves without touching the reflector. For example, the blade 9 can have a diameter of 25 mm and a thickness of 1 mm and the distance between the bilamellar transducer and the face 4 of the reflector is of the order of 2 mm.

From the point of view of the relation of the surfaces, it is not necessary for the surface area of the transducer to be too great with respect to that of the reflector. In the example as shown in FIGS. 2 and 3, the surface area of the reflector is, for example, of the order of 55 times that of the transducer.

FIG. 4 shows, in front view, another embodiment of a hydrophone *2a* having the form of a square 250 mm on a side composed of a single acoustical reflector *3a* and five transducers *8a* with flexible blades identical to the transducer 8; the transducers *8a* are spaced 2 mm from the front face *4a* of the reflector and are connected in series. In this example, the ratio between the surface area of the reflector and that of the five transducers, is of the order of 25. According to a characteristic feature of the invention, the ratio of the surface area of the acoustical reflector and the total surface area of the transducers placed in front thereof is at least equal to 20.

The problem to be resolved is the support of the transducers at a desired distance from the front face of the reflector without reducing either the efficiency of the reflector or that of the transducer.

According to the invention this problem is resolved by securing the reflector and the one or more transducers by means of a layer of synthetic resin 12, for example, polyurethane resin which encapsulates both the transducers and the reflector and which has the advantage of forming a protective envelope which is absolutely water-tight.

The thickness of this resin layer is of the order of several millimeters but it has a reduced section 13 adjacent each of the transducers, said section 13 being reduced to a thickness of about 1 mm for transducers having a diameter of the order of 25 mm in order to present a sufficient flexibility in order not to dampen excessively the deformation in flexure of the blade of the transducer.

FIG. 5 shows on greater scale a transducer 8 with flexible blade 9 of bilamellar type placed in front of the reflective face 4 of an acoustical reflector 5. There is seen in this figure the resin layer 12 which covers the transducer and the reflector and the reduced section 13 of this resin layer which forms a hollow in relation to the transducer.

Transducers with flexible blades are known covered individually by a synthetic resin layer. A hydrophone according to the invention constitutes a novel application of this type of transducer.

On the graph in FIG. 6, the abscissa represents frequency KHZ and the ordinate represents sensitivity Sh expressed in decibels.

Curve Cl shows the variations of sensitivity as a function of frequency of a hydrophone with a flexible blade without a reflector. The sensitivity reaches a maximum for a frequency Fo and rapidly decreases on both sides thereof such that the frequency band in which the hydrophone is utilizable is a relatively narrow band.

Curve C2 shows the sensitivity of a hydrophone according to the invention.

This curve shows that the sensitivity is very great for low frequencies, for example, for frequencies lower than 5KHZ.

This result is very useful since the currently known hydrophones which comprise a transducer sensitive to pressure placed at a distance ($\lambda/4$) in front of a reflector are not utilizable for frequencies of the order of several kilohertz.

In fact, for such frequencies the length ($\lambda/4$) becomes very great, of the order of several decimeters, and the complexity of receiver antennaes exceeds the permissible limits for immersed antennaes.

Of course, without departing from the framework of the invention, the elements constituting the hydrophones which have just been described by way of example, can be replaced by equivalent elements which fall within the bounds of the appended claims.

What is claimed is:

1. A hydrophone comprising an acoustical reflector, at least one transducer disposed adjacent said reflector, and a common envelope for said transducer and reflector;

said reflector comprising a flexible sealed container, two rigid parallel plates disposed in said container and sheets of interlaced filaments disposed between said plates, said transducer being a piezoelectric transducer comprising a thin flexible blade in the form of a disc, at least one piezoelectric disc fixed to a surface of said blade, and a rigid annular ring to which said blade is fixed at the periphery thereof, said reflector and transducer being entirely embedded in said common envelope with said flexible blade in immediate proximity to said reflector.

2. A hydrophone as claimed in claim 1 wherein said envelope is constituted of a synthetic resin having a thickness of about several millimeters.

3. A hydrophone as claimed in claim 1 wherein said envelope has an area of reduced thickness of about 1 mm. facing said transducer.

4. A hydrophone as claimed in claim 1 wherein said rigid annular ring has one surface facing said reflector and an opposite surface facing away from said reflector, said blade being fixed to said one surface of the ring.

5. A hydrophone as claimed in claim 1 wherein the ratio of the surface area of the reflector to that of the transducer is at least 20.

6. A hydrophone as claimed in claim 1 wherein a plurality of said transducers are connected in series to form an overall transducer assembly.

* * * * *